(12) United States Patent
Zhu

(10) Patent No.: US 6,758,722 B2
(45) Date of Patent: Jul. 6, 2004

(54) DUAL-PURPOSE LAPPING GUIDE FOR THE PRODUCTION OF MAGNETO-RESISTIVE HEADS

(75) Inventor: Li-Yan Zhu, San Jose, CA (US)

(73) Assignee: SAE Magentics, (H.K.) Ltd., Hong Kong (CN)

(*) Notice: Subject to any disclaimer, the term of this patent is extended or adjusted under 35 U.S.C. 154(b) by 0 days.

(21) Appl. No.: 10/194,535

(22) Filed: Jul. 12, 2002

(65) Prior Publication Data

US 2004/0009739 A1 Jan. 15, 2004

(51) Int. Cl.[7] ................................................ B24B 1/00
(52) U.S. Cl. ............................ 451/5; 451/11; 451/10; 451/41
(58) Field of Search .......................... 451/5, 11, 1, 9, 451/10, 41, 28; 29/603.09, 603.16, 603.17, 593

(56) References Cited

U.S. PATENT DOCUMENTS

| | | | | |
|---|---|---|---|---|
| 4,511,942 A | * | 4/1985 | Valstyn | 360/126 |
| 4,675,986 A | * | 6/1987 | Yen | 29/603.1 |
| 4,689,877 A | * | 9/1987 | Church | 29/603.1 |
| 4,739,562 A | * | 4/1988 | Kracke et al. | 33/567 |
| 4,912,883 A | * | 4/1990 | Chang et al. | 451/1 |
| 5,023,991 A | * | 6/1991 | Smith | 29/603.09 |
| 5,095,613 A | * | 3/1992 | Hussinger et al. | 29/603.17 |
| 5,210,667 A | * | 5/1993 | Zammit | 360/316 |
| 5,494,473 A | * | 2/1996 | Dupuis et al. | 451/1 |
| 5,588,199 A | * | 12/1996 | Krounbi et al. | 29/603.1 |
| 5,597,340 A | * | 1/1997 | Church et al. | 451/5 |
| 5,738,566 A | * | 4/1998 | Li et al. | 451/28 |
| 5,772,493 A | * | 6/1998 | Rottmayer et al. | 451/5 |
| 5,876,264 A | * | 3/1999 | Church et al. | 451/5 |
| 5,997,381 A | * | 12/1999 | Dee et al. | 451/5 |
| 6,027,397 A | * | 2/2000 | Church et al. | 451/1 |
| 6,193,584 B1 | * | 2/2001 | Rudy et al. | 451/5 |
| 6,230,389 B1 | * | 5/2001 | Zhu | 29/603.1 |
| 6,532,646 B2 | * | 3/2003 | Watanuki | 29/603.12 |

* cited by examiner

Primary Examiner—George Nguyen
(74) Attorney, Agent, or Firm—Kenyon & Kenyon

(57) ABSTRACT

An integrated lapping guide (ILG) is described including at least one read-head and an electronic lapping guide (ELG). In one embodiment, the ELG is offset from the height of the read-head. Resistance between the read-head and the ELG can be measured during the lapping process. During the initial phase of the lapping process, the ELG dominates the change in ILG resistance and provides a long-range stripe-height control allowing for inclination and bending of the row of magneto-resistive (MR) heads. During the latter phases of the lapping process, the read-head dominates the change in ILG resistance and provides a short-range, uniform read-head resistance control. In this embodiment, the transition between the long-range stripe-height control and the short-range, uniform read-head resistance control is smooth, providing a marked benefit to the read-head manufacturing process.

15 Claims, 3 Drawing Sheets

DUAL-PURPOSE LAPPING GUIDE FOR THE PRODUCTION OF MAGNETO-RESISTIVE HEADS

FIELD OF THE INVENTION

The present invention is directed to the fabrication of slider components for use in disk drives and the like. More particularly, the present invention pertains to a lapping guide to assist in the manufacturing of magneto-resistive head structures.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Many current disk drives include one or more magneto-resistive (MR) read-write heads. Such heads include MR sensor elements that are manufactured through the patterning of magneto-resistive layers. A description of the manufacture of such a MR read-write head can be found in U.S. Pat. No. 6,230,389, the disclosure of which is hereby incorporated by reference in its entirety. As these layers become smaller in dimension, it becomes more difficult to control the final operating characteristics of such heads.

An MR read head includes a giant magneto-resistive (GMR) head and includes at least one thin film sensor that has a "stripe-height" and resistance that must be precisely controlled. Traditionally, the precise sensor stripe-height is achieved through a lapping process. During the wafer process, a plurality of MR heads and a plurality of stripe-height sensors are interleaved and arranged in an orthogonal grid pattern. The size of the stripe-height sensor is usually much larger than the MR sensor, so that its dimensions can be made precisely.

A finished wafer is cut into rows. Each row contains a plurality of MR heads and a plurality of electronic lapping guides (ELGs). A surface of the row is then lapped to reduce the MR head stripe-height. By measuring the resistance of the stripe-height sensors, their stripe-height can be calculated precisely. Therefore, the stripe-height sensors are often called resistive lapping guides (RLGs) or ELGs. During lapping, the ELG stripe-heights are monitored frequently, so that inclination and bending of the row can be corrected by applying a suitable force or moment on the row. Provided that the difference (offset) between ELG stripe-height and MR read-head stripe-height is a constant, the read-head stripe-height can be controlled through the control of the ELG stripe-height. However, the offset between a narrow read-head and a wide LEG is neither precisely known, nor uniform Therefore, the resulting accuracy in read-head stripe-height is less than satisfactory.

Furthermore, a uniform stripe-height is not, alone, adequate. In a magnetic recording device, the electronic circuit is designed for specific read-head resistance. Due to variation in the read-head width and film resistivity across the wafer, a uniform stripe-height does not imply a uniform read-head resistance. Thus, it is strongly desirable to control the read-head resistance, instead of its stripe-height.

Accordingly, there is a need for an improved method and apparatus for providing a lapping guide in the production of MR heads.

SUMMARY OF THE INVENTION

According to an embodiment of the present invention, an integral lapping guide (ILG) is provided with at least one read-head and one rectangular ELG coupled in series. Two external leads are provided for measuring resistance across these components. In one embodiment, the read-head of the lapping guide is identical in structure to the actual read-heads (i.e., those to be included in the final product). The ELG width is selected to provide adequate range in stripe-height measurement. A large stripe-height offset between the read-head and the ELG is selected such that when the read-head resistance approaches the desired target value, the read-head resistance will be dominant over the ELG resistance.

The resistance of the ILG is approximately the sum of the read-head and ELG resistance. The resistance of the internal connections would be negligible. When the read-head stripe-height is large, the ILG resistance is predominantly that of the ELG. The stripe-height can be calculated simply and accurately by treating the read-heads as leads of the ELG. The ILG acts as an effective stripe-height sensor.

When the read-head stripe-height becomes small, the ILG resistance is dominated by the resistance of the read-head. Due to a large stripe-height offset between the ELG and the read-head, the ELG resistance is insensitive to stripe-height. The read-head resistance can be estimated by subtracting the ELG resistance from the ILG resistance. Since the ELG dimension is very large compared with the target stripe-height of the read head, the ELG resistance can be estimated accurately.

The ILG may be treated as a stripe-height sensor at a large stripe-height, and a resistance sensor at a low stripe-height. When the ILG is treated as a resistance sensor, the resistance should be converted into a pseudo stripe-height by approximation. A suitable method is provided according to an embodiment of the present invention that ensures smooth transition between the above two treatments. For example the ILG may be treated as both types of sensors at all times. Then a weighted average of ELG stripe-height and read-head pseudo stripe height can be obtained.

According to an embodiment of the present invention, a method is described to best utilize this structure. Instead of approximating the ILG has two distinct sensors at two extremes of the stripe-height, the ILG is approximated by a single model throughout the entire range of the stripe-height. A single formula may be derived to generate a pseudo stripe-height that approximates the ELG stripe-height when the latter is large, and approximately the read-head pseudo height when the latter is small. This method can be both simple and robust.

DETAILED DESCRIPTION

Figure 1:
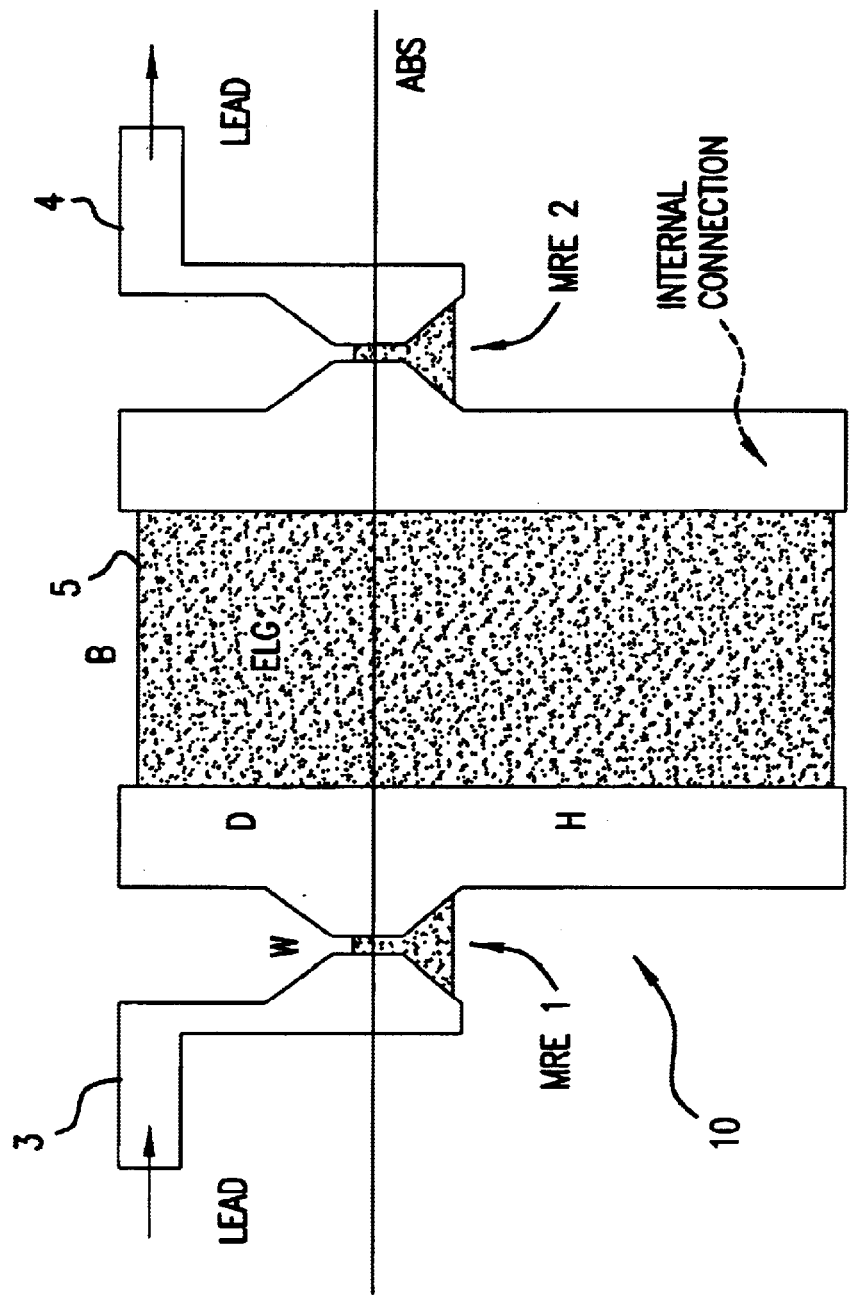
FIG. 1 is a plane view of an integral lapping guide constructed according to an embodiment of the present invention.

FIG. 1 is a plan view of an integral lapping guide according to an embodiment of the present invention. The electronic lapping guide (ELG) of the present invention may be used for read-head resistance control, if the profiles of the film resistivity, read-width, and stripe-height offset across a row are known. However, the last two parameters are difficult to measure. As an alternative, the read-head may be used as a lapping guide. Without knowing the exact read-width, the actual stripe-height may not be precisely known. However, using a nominal read-width, a pseudo stripe height may be calculated. The pseudo stripe-height increases smoothly and monotomically with the actual stripe-height. Furthermore, when the pseudo stripe-height reaches its nominal target value, the desired read-head resistance is achieved. Therefore, it is advantageous to use the read-head as a lapping guide in this regard.

One major difficulty is that the read-head is relatively narrow, and does not have adequate range for lapping control. For example, the effective range of a 0.15 $\mu$m wide read-head is no more than the 0.30 $\mu$m stripe-height. However, approximately 5.0 $\mu$m range is need for standard lapping machines known in the art to correct for inclination and bending of the row of MR heads. A long-range ELG and short-range read-head for lapping control is to be provided according to an embodiment of the present invention. Near the end of the lapping operation, the short-range read-head is relied upon for control. In the prior art, the ELG and read-head are treated as separate lapping guides, each with two leads. Thus, additional wafer area is needed to accommodate duplicate lapping guides. Also, additional wiring and electronic circuits are need to access and process the two independent lapping guides.

Referring to FIG. 1, an embodiment of the ILG 10 is shown. The ILG includes a first read-head MRE 1 and a second read-head MRE 2. In this embodiment, the read-heads 1, 2 are identical. First and second leads 3, 4 are provided so that current flows through the read-heads 1, 2 and the ELG 5. The stripe heights for the ELG 5 and the read-heads 1 and 2 are measured from the top of the read-head sensor stripes, into the volume to be lapped. To provide adequate resolution at 10 $\mu$m ELG stripe-height, the width B of the ELG is selected to be approximately 10 $\mu$m in this embodiment. To ensure that the ELG resistance is small compared with read-head resistance, two design features are incorporated according to this embodiment of the present invention. First, two read-heads are put in series with the ELG, in order to provide adequately high read-head resistance. Second, the stripe-height offset D between read-head and ELG is chosen to be 5 $\mu$m, which is much greater than the final read-height stripe-height (e.g., 0.15 $\mu$m), to yield an adequately low ELG resistance.

Internal connections between the read-heads and the ELG, and the ILG leads, include the same material, and are deposited at the same time, using the same masks as the lead in the actual read-heads. As with the actual read-heads, the widths of ILG leads and internal connections are to be minimized, for compactness, and to minimize the vulnerability to electrical short circuits caused by conductive smears. Presently the widths can be made below 5 $\mu$m.

The ILG leads may be routed through via-holes to bonding pads on the top of wafer deposit surface in much the same way as leads of the actual read-heads.

Figure 2:
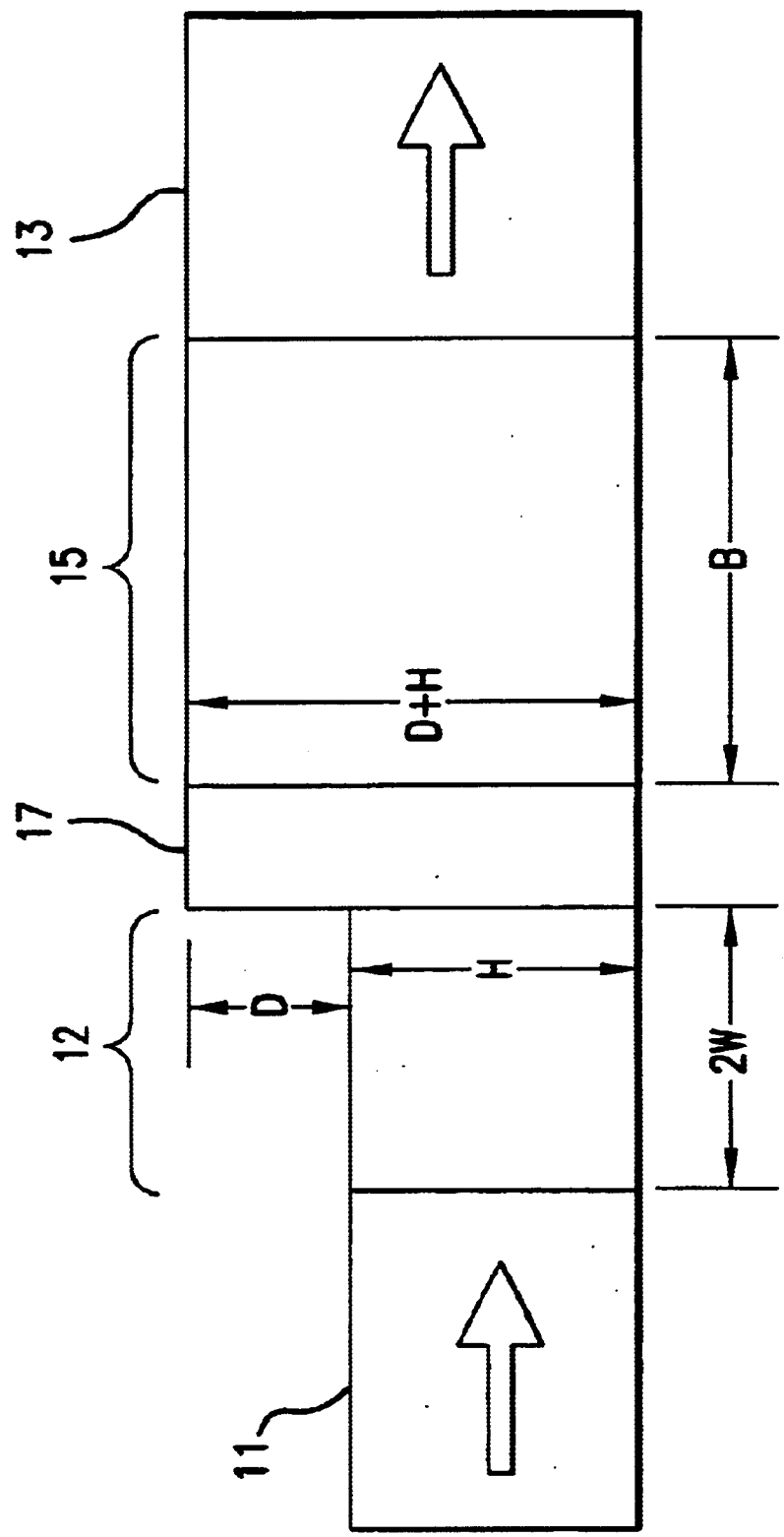
FIG. 2 is a mathematical model for the ILG of FIG. 1 according to an embodiment of the present invention.

The ILG is modeled as two resistive rectangles connected by ideal conducts in series. Referring to FIG. 2, a mathematical model for the ILG of FIG. 1 is shown. The first and second leads are represented by blocks 11 and 13, respectively. The internal connection that "sandwiches" the ELG 5 is represented by block 17. As stated above, the resistance of these blocks is assumed to by negligible in this mathematical model. The two read-heads 1, 2 of FIG. 1 are represented by block 12 and the ELG is represented by block 15. In this embodiment, the width of the read-head is represented by W and the width of the ELG is represented by B. The stripe height is represented by H and the remaining depth of the ELG is represented by D.

Assuming that R represents the variable resistance of the ILG, L represents the nominal lead-resistance and Q represents the film resistivity for the ILG, then $$R = \frac{QB}{H+D} + \frac{2QW}{H} + L \qquad \text{Eq. 1}$$

Where the first term represents the resistance of the ELG and the second term represents the resistance of the read-heads and L represents the nominal lead resistance. A normalized resistance, S, can be defined as $$S = \frac{R-L}{Q} \qquad \text{Eq. 2}$$

And an effective width of the ILG can be defined as $$E = B + 2W - SD \qquad \text{Eq. 3}$$

With these intermediate variables, the pseudo ILG stripe-height, H, is given by $$H = \frac{E + \sqrt{E^2 + 8DSW}}{2S} \qquad \text{Eq. 4}$$

With r and l being the target resistance and the nominal lead resistance of the read-head respectively, the lapping target of the pseudo-ILG stripe-height, $H_T$, is given by the following equation $$H_T = \frac{QW}{r-l} \qquad \text{Eq. 5}$$

The actual read-head stripe-height is useful for device and wafer-process analysis. Since the ILG does not provide the actual read-head stripe-height, the wafer layout may contain a mix of ILG and conventional ELG similar to that which is described in U.S. Pat. No. 6,230,389.

Figure 3:
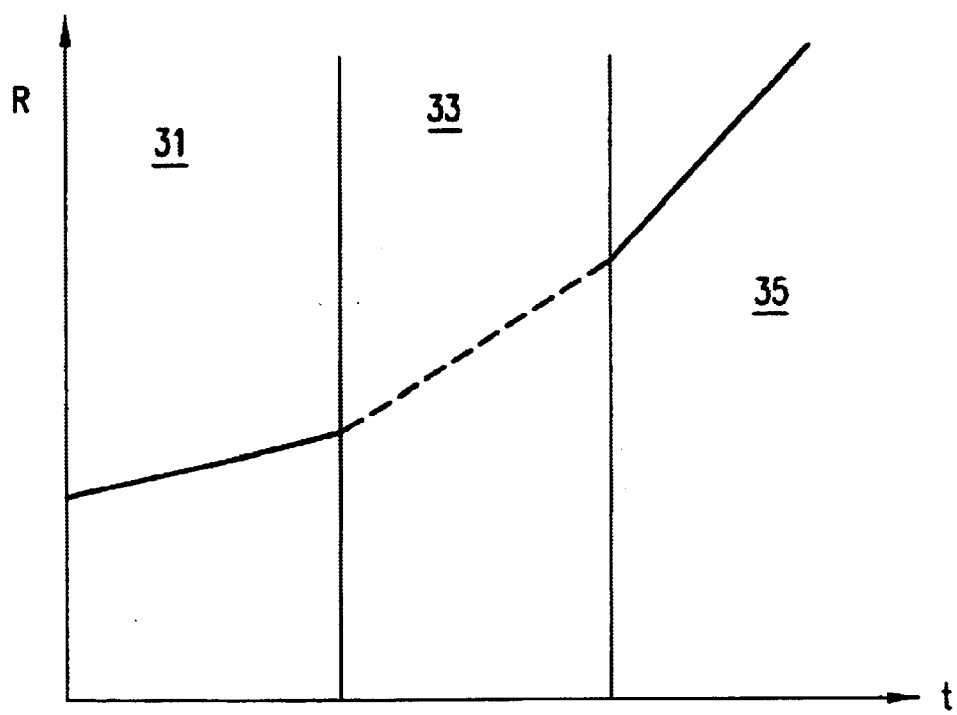
FIG. 3 is a graph showing ILG resistance as it changes during the lapping process according to an embodiment of the present invention.

Looking again at FIG. 1, a feature of the design is that there is a relatively large offset D of the ELG 5 relative to the MRE read-heads 1, 2. Referring to FIG. 3, a graph showing the effect of lapping on resistance is shown. The Y-axis represents the logarithmic function of the resistance R between the first and second leads 3,4 in FIG. 1. The X-axis represents elapsed time during the lapping operation (and is thus proportional to stripe-height). The first part of the lapping operation is shown as element 31. In this phase, the contribution to overall resistance by the read-heads 1,2 is constant since the heads are not being lapped during this phase. The ELG 5 (FIG. 1) is, however, being lapped, and as the ELG is lapped, resistance increases at a relatively low rate. It is during this phase that ELG provides a long-range stripe-height control allowing for inclination and bending of the row of MR heads to be performed.

In the second phase 33 of the lapping operation, the read-heads 1, 2 begin to be lapped along with the ELG 5. In this embodiment of the present invention, the read-heads have a funnel shape, such that the width of the read-heads decreases to the eventual width W as the lapping operation continues. In this phase, the resistance of the read-heads 1, 2 begins to change as the lapping operation continues, and begins to exert more influence over the overall resistance of the ILG. As the lapping operation reaches the final phase 35, the overall resistance of the ILG is dominated by the read-heads 1,2. Effectively, in this final phase, the resistance of the ELG 5 is relatively constant, primarily because the ELG extends an offset distance D above the read-heads. As seen from the graph of FIG. 3, the transition between the ILG resistance being dominated by the ELG and then by the read-heads is relatively smooth, having a beneficial effect during the lapping operation. It is in this final phase that the read-heads provide a short range lapping control allowing a uniform read-head resistance in the row of MR heads.

In the above example, the width W of the read-heads is approximately 0.2 $\mu$m and the target stripe height is approximately 0.15 $\mu$m These two parameters are determined by product specification and not constrained by the ILG design. The offset is approximately 5 $\mu$m in this embodiment, which equals the stripe-height range required for inclination and bending control. The width B of the ELG is preferably twice that of the offset. In this embodiment, the width B is approximately less than or equal to 10 $\mu$m.

After the lapping operation is complete, those elements in the "kerf" are removed during the dicing process that extricates the MR heads from the row. In this embodiment, the entire ILG is contained in the kerf. As stated above, the ILG functions with only one read-head and one ELG. In this embodiment, two read-heads are employed to boost the dominance of read-head resistance over the ELG stripe-height, in the calculation of a pseudo stripe-height.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A lapping guide for a magneto-resistive read-head comprising:

first and second leads;

a first magneto-resistive read-head coupled to said first lead;

a first internal connection coupled to said first read-head; and an electronic lapping guide coupled between said first internal connection and said second lead.

2. The lapping guide of claim 1 wherein said first read-head is identical to a read-head in a magneto-resistive (MR) head structure.

3. The lapping guide of claim 2 further comprising:

a second internal connection coupled between said electronic lapping guide and said second lead; and a second read-head coupled between said second internal connection and said second lead.

4. The lapping guide of claim 3 wherein said second read-head is identical to said first read-head.

5. The lapping guide of claim 1 wherein said electronic lapping guide is rectangular in shape and is offset by an amount D from the first read-head.

6. The lapping guide of claim 5 wherein D is 5 $\mu$m.

7. A method of manufacturing a magneto-resistive read-head comprising:

providing an integrated lapping guide by
     forming first and second leads in a substrate;
     forming a first read-head in a substrate coupled to said first lead;
     forming a first internal connection in said substrate coupled to said first read-head; and
     forming an electronic lapping guide in said substrate between said first internal connection and said second lead.

8. The method of claim 7 further comprising:

lapping said integrated lapping guide while measuring resistance between said first and second lead until reaching a desired stripe-height for said first read-head.

9. The method of claim 8 wherein said first read-head is identical to a read-head in a magneto-resistive (MR) head structure.

10. The method of claim 7 wherein forming said integrated lapping guide further includes forming a second internal connection coupled between said electronic lapping guide and said second lead; and forming a second read-head coupled between said second internal connection and said second lead.

11. The method of claim 10 wherein said second read-head is identical to said first read-head.

12. The method of claim 8 wherein forming said integrated lapping guide further includes forming a second internal connection coupled between said electronic lapping guide and said second lead; and forming a second read-head coupled between said second internal connection and said second lead.

13. The method of claim 12 wherein said second read-head is identical to said first read-head.

14. The method of claim 8 wherein said electronic lapping guide is rectangular in shape and is offset by an amount D from the first read-head.

15. The method of claim 14 wherein D is 5 $\mu$m.

* * * * *

UNITED STATES PATENT AND TRADEMARK OFFICE
CERTIFICATE OF CORRECTION

PATENT NO. : 6,758,722 B2   Page 1 of 1
APPLICATION NO. : 10/194535
DATED : July 6, 2004
INVENTOR(S) : Li-Yan Zhu It is certified that error appears in the above-identified patent and that said Letters Patent is hereby corrected as shown below:

In the DETAILED DESCRIPTION, Column 3, Line 24, delete "monotomically" and replace with -- monotonically --.

In the DETAILED DESCRIPTION, Column 4, Line 66, delete "logorithmic" and replace with -- logarithmic --.

Signed and Sealed this

Seventh Day of September, 2010

David J. Kappos
*Director of the United States Patent and Trademark Office*